United States Patent [19]

Martin et al.

[11] 4,256,844

[45] Mar. 17, 1981

[54] FIRE RETARDANT, THERMOSETTING, RESINOUS REACTION PRODUCTS OF PHOSPHORIC ACID AND METHYOL- OR ALKOXYMETHYL-SUBSTITUTED EPOXIDES

[75] Inventors: Patrick H. Martin, Danville; Paul G. Schrader, Antioch; Robert R. Stringham, Concord, all of Calif.

[73] Assignee: The Dow Chemical Company, Midland, Mich.

[21] Appl. No.: 46,290

[22] Filed: Jun. 7, 1979

Related U.S. Application Data

[63] Continuation-in-part of Ser. No. 753,766, Dec. 23, 1976, abandoned.

[51] Int. Cl.³ .................... C08G 59/14; C08G 8/28
[52] U.S. Cl. .................................... 521/59; 521/178; 521/181; 260/451; 260/343.4; 568/630; 568/631; 568/635; 568/640; 528/99; 528/108; 528/96; 525/507

[58] Field of Search ................ 260/951, 343.4; 568/630, 631, 635, 640; 521/59, 178, 181; 528/99, 96, 108; 525/507

[56] References Cited

U.S. PATENT DOCUMENTS

| | | | |
|---|---|---|---|
| 3,328,319 | 6/1967 | Galinke et al. | 260/2 |
| 3,433,769 | 3/1969 | Juneau | 260/58 |
| 3,514,418 | 5/1970 | Schwarzer | 260/28 |
| 3,538,042 | 11/1970 | Forster | 260/37 |
| 3,773,799 | 11/1973 | Schmid | 260/348 R |
| 3,839,239 | 10/1974 | Godfried | 260/2.5 EP |
| 3,859,255 | 1/1975 | Heer et al. | 260/51 EP |
| 3,925,315 | 12/1975 | Schmid | 260/47 EN |

*Primary Examiner*—Earl A. Nielsen
*Attorney, Agent, or Firm*—R. R. Stringham

[57] ABSTRACT

Phosphoric acid is reacted with mono- or polyfunctional epoxides containing methyol or alkoxymethyl groups, to provide resins which are curable simply by heating and contain as much as about 30 weight percent of phosphoric acid. Improved flame retardancy and water resistance are imparted to structural foams by impregnating them with these resins and curing in-situ.

30 Claims, No Drawings

FIRE RETARDANT, THERMOSETTING, RESINOUS REACTION PRODUCTS OF PHOSPHORIC ACID AND METHYOL- OR ALKOXYMETHYL-SUBSTITUTED EPOXIDES

CROSS-REFERENCE TO RELATED APPLICATION

The present application is a continuation-in-part of co-pending application, Ser. No. 753,766, filed Dec. 23, 1976, and now abandoned.

BACKGROUND OF THE INVENTION

It is known to produce fire-retardant resins by curing various types of epoxide resins with phosphoric acid. U.S. Pat. No. 2,541,027 discloses resinous compositions prepared by reacting phosphoric acid or monoalkyl dihydrogen phosphates with epoxides containing at least 6 carbon atoms, one or more ethereal oxygen atoms and having a 1,2-epoxide equivalency greater than one. The disclosed compositions are said to have utility as protective surface coatings, particularly when applied to ferruginous metals.

It is also known to prepare resins from epoxides containing methylol-substituted benzene rings. U.S. Pat. No. 2,965,607 discloses the preparation of viscous liquids, having utility as plasticizers, by polymerizing the methyl ether of 2-epoxypropyl-4,6-dimethylolphenol

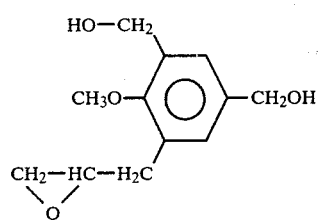

with aluminum or stannous chloride catalyst. No use of phosphoric acid in any role with the starting phenol or with the resulting polymers is disclosed.

U.S. Pat. No. 3,925,315 discloses the preparation of rapid curing, epoxide pre-polymers having the formula

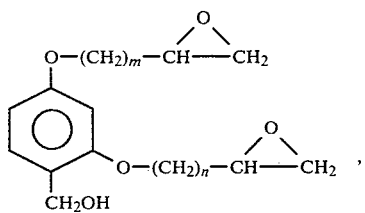

wherein m and n each have a value of at least 1. (The '315 patent also discloses that methylol-substituted polyether epoxides such as

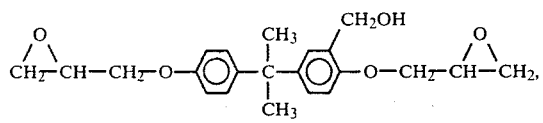

are known but cure less rapidly.) The methylolepoxides claimed in the '315 patent are said to have utility as adhesives, protective coatings and as encapsulants for electrical components. Again, incorporation of phosphoric acid is not disclosed.

It has not been suggested previously that useful resins might be prepared simply by reacting methylol- (or alkoxymethyl) substituted epoxides with phosphoric acid, or even that such reactions should be attempted.

The prior art is particularly deficient in not recognizing that thermosetting (and otherwise desirable) resins can be obtained by reacting mono-functional epoxides with phosphoric acid, provided that at least one methylol or alkoxymethyl group is present in the epoxide molecule.

The failure of prior workers to realize the advantages of, or to prepare, reaction products of phosphoric acid with epoxides containing methylol or alkoxymethyl groups may well be due to the fact that the latter types of groups are themselves known to be quite reactive. That is, reaction of the oxirane group(s) and of the methylol (or alkoxymethyl) groups with phosphoric acid (or with each other) would be expected to occur. In fact, it has been found that anisyl alcohol (p-methoxy benzyl alcohol) reacts very readily with phosphoric acid in dioxane solution and at room temperature to form a mixture of products which can be shown by infra-red and nuclear magnetic resonance spectroscopic analyses to contain no alcoholic hydroxyl groups.

OBJECTS OF THE INVENTION

A primary object of the present invention is to provide thermosettable epoxide-based resins which, when impregnated into structural foams and cured, impart flame retardancy and water resistance to those foams.

A further object is to provide heat-curable epoxide-based resins which contain relatively large amounts of an inexpensive ingredient (phosphoric acid) which may themselves be foamed and have utility as fire retardant impregnants or coatings for wood and plastic films.

An additional object is to provide a simple, one-step process for preparing thermosettable resins from methylol- or alkoxymethyl substituted epoxides which may have epoxide functionalities as low as one.

Yet another object is to provide for the modification of the foregoing process by utilizing epoxides of the requisite type which are resins in their own right.

Further objects will be made apparent to those skilled in the art by the following specification.

SUMMARY OF THE INVENTION

The present invention is the process of reacting a methylol- or loweralkoxymethyl-substituted epoxide with a phosphoric acid source material, and the resulting reaction product.

More specifically, said process is the method of preparing a heat-curable, flame retardant resin which comprises:

contacting a methylol- or alkoxymethyl-substituted epoxide, as defined below, with orthophosphoric acid ($H_3PO_4$) mixed with 0 to 4 molecular proportions of water per molecular proportion of $H_3PO_4$, the amount of acid being such as to provide at least 0.7 P—OH hydroxyls per oxirane group, until essentially all of the oxirane groups originally present in said epoxide have been converted to glycol or phosphoester groups, said epoxide consisting essentially of molecules, each of which, independently, is of the formula

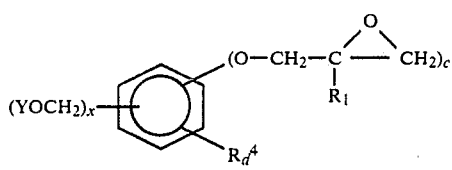
(a)

wherein Y is H or a $C_1$ to $C_4$ alkyl or $C_2$-$C_4$ alkenyl group,
each YOCH$_2$— group is either ortho or para to a glycidyloxy group,
x is 1, 2 or 3, c is 1 or 2 and d is 0 or 1;
$R^1$, independently in each occurrence, is H, methyl or ethyl;
$R^4$ is Br, Cl, a $C_1$-$C_{12}$ alkyl, alkenyl, cycloalkyl, phenyl, alkylphenyl, phenalkyl or phenoxy group, a

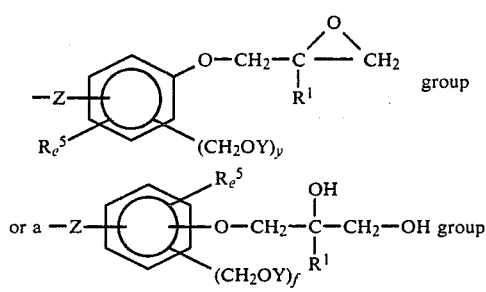
group wherein, independently, in each of the latter two groups, Z is $>C(CF_3)_2$, —SO$_2$—, —S—, —O—, or a valence bond,
$R^1$ is —H, —CH$_3$ or —C$_2$H$_5$,
$R^5$ is a $C_1$ to $C_{12}$ alkyl, alkenyl, cycloalkyl, phenyl, alkylphenyl, phenoxy, —Br or —Cl group,
y and f are each 0, 1 or 2 and e is 0 or 1;
and
(x+f) is not greater than 4 and
(x+y) is 2, 3 or 4;

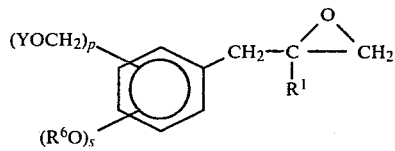
(b)

wherein s is 0 or 1 and p is 1, 2 or 3;
$R^6$ is a $C_1$ to $C_{12}$ alkyl or a

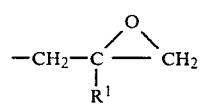
group,
and $R^1$ and Y are defined as in formula (a),

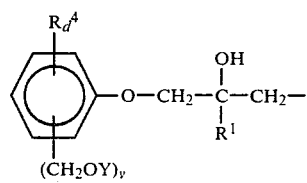
(c)

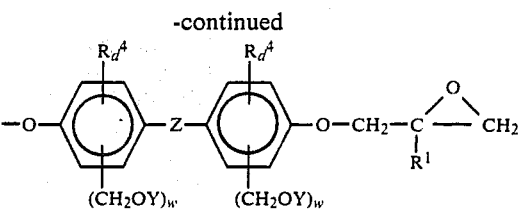

wherein Y, $R^1$, $R^4$, d and Z are as defined as in formula (a), v is 1, 2 or 3 and w, independently in each occurrence, is 0, 1 or 2,

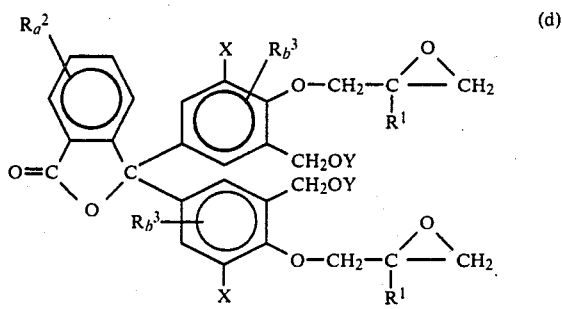
(d)

wherein, independently, in each occurrence
$R^1$ is H, methyl or ethyl,
X is H, —CH$_2$OY, —Br, Cl or a $C_1$-$C_4$ alkyl or alkenyl group,
$R^2$ is —Br or —Cl,
$R^3$ is methyl or ethyl,
Y is H or a $C_1$-$C_4$ alkyl or alkenyl group,
a is 0, 1, 2, 3 or 4 and b is 0 or 1,

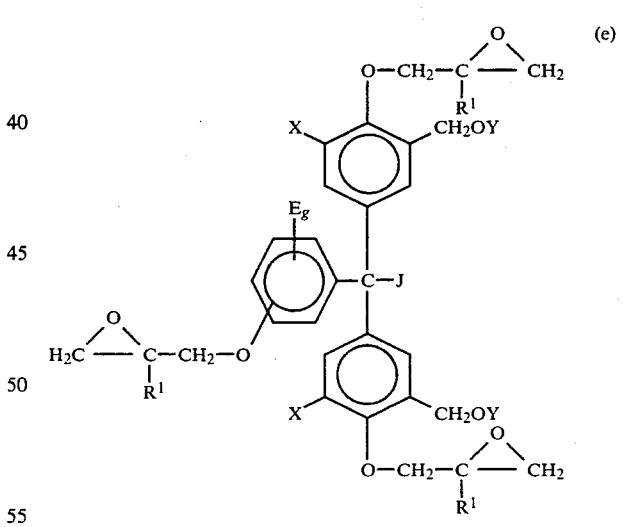
(e)

wherein,
J is H or a $C_1$-$C_{10}$ alkyl or alkenyl group,
Y is H or a $C_1$-$C_4$ alkyl or alkenyl group,
$R^1$ is H, methyl or ethyl
X is H, —CH$_2$OY, —Br, —Cl or a $C_1$-$C_4$ alkyl or alkenyl group, independently in each occurrence,
E is —CH$_2$OY, —Br, —Cl or a $C_1$-$C_4$ alkyl group, independently in each occurrence, and
g is 0, 1 or 2,
or
(f) methylol substituted, oligomeric monoepoxides of the formula

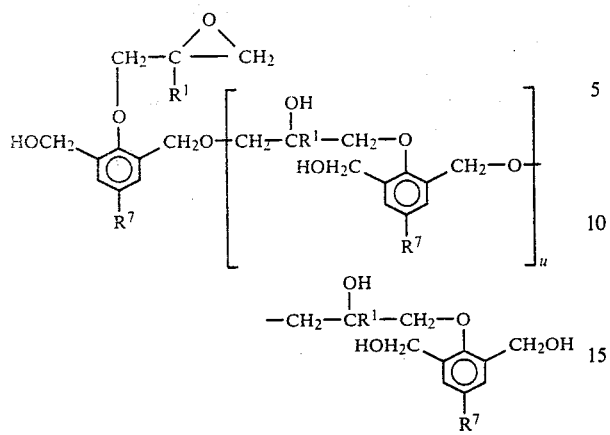

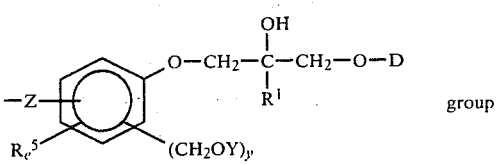

group in which, Z is $>C(CF_3)_2$, $-SO_2-$, $-S-$, $-O-$ or a valence bond, $R^1$ is $-H$, methyl or ethyl, Y and D are as above defined, $R^5$ is Br, Cl, a $C_1$-$C_{12}$ alkyl, alkenyl, cycloalkyl, phenyl, alkylphenyl or phenoxy group;

y is 0, 1 or 2 and e is 0 or 1; (x+y) is 2, 3 or 4;

and the number ratio of D's which are H to D's which are $PO(OH)_2$ is about 1 or less;

wherein u is 0, 1, 2 or 3, $R^1$, independently in each occurrence, is H, methyl or ethyl and $R^7$, independently in each occurrence, is a $C_1$-$C_{12}$ alkyl, alkenyl, cycloalkyl, phenyl, phenalkyl or alkylphenyl group.

The product embodiment of the present invention may be defined as:

a resinous, heat-convertible, fire-retardant composition consisting essentially of (A) from 0 to 25 wt. percent of free $H_3PO_4$, and (B) from 75 to 100 wt. percent of organic molecules, each of which, independently, is of the formula

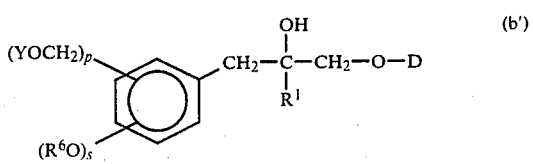 (b')

wherein $R^1$, Y and D are defined as in formula (a'), $R^6$ is a $C_1$ to $C_{12}$ alkyl or a

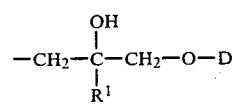

group, s is 0 or 1 and p is 1, 2 or 3;

(a')

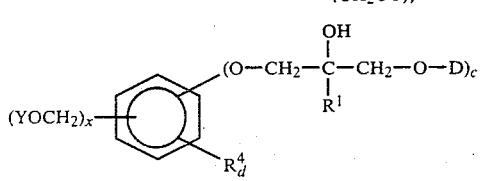

wherein

Y is H or a $C_1$ to $C_4$ alkyl or a $C_2$-$C_4$ alkenyl group and each YO—$CH_2$— group is either ortho or para to an

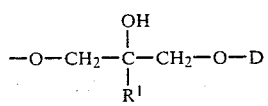

group,

D is H or $PO(OH)_2$, x is 1, 2 or 3, c is 1 or 2 and d is 0 or 1;

$R^1$, independently in each occurrence, is H, methyl or ethyl;

$R^4$ is Br, Cl, a $C_1$-$C_{12}$ alkyl, alkenyl, cycloalkyl, phenyl, alkylphenyl, phenalkyl or phenoxy group, or a (c')

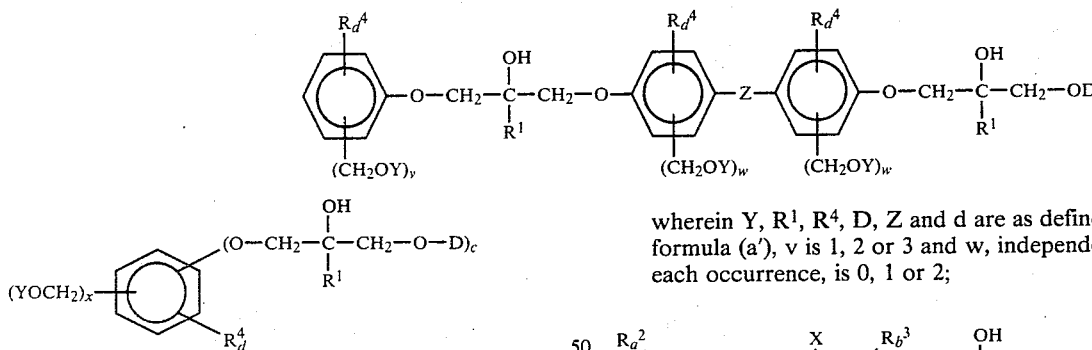

wherein Y, $R^1$, $R^4$, D, Z and d are as defined as in formula (a'), v is 1, 2 or 3 and w, independently in each occurrence, is 0, 1 or 2;

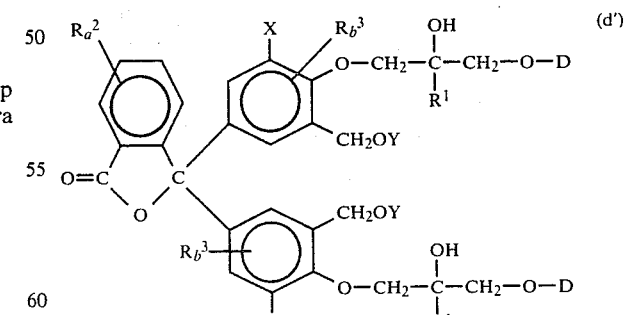 (d')

wherein, independently, in each occurrence $R^1$, Y and D are as defined in formula (a'), X is H, —$CH_2OY$, —Br, Cl or a $C_1$-$C_4$ alkyl or alkenyl group, $R^2$ is —Br or —Cl, $R^3$ is methyl or ethyl, a is 0, 1, 2, 3 or 4 and b is 0 or 1;

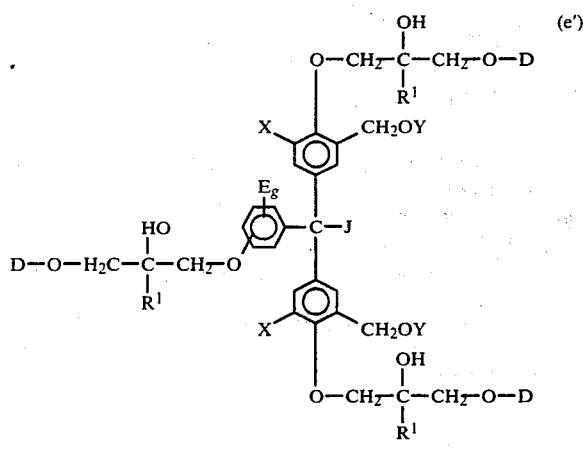 (e')

wherein,

J is H or a $C_1$–$C_{10}$ alkyl or alkenyl group, $R^1$, Y and D are as defined in formula (a'), X is H, —$CH_2OY$, —Br, —Cl or a $C_1$–$C_4$ alkyl or alkenyl group, independently in each occurrence, E is —$CH_2OY$, —Br, —Cl or a $C_1$–$C_4$ alkyl group, independently in each occurrence, and g is 0, 1 or 2, or

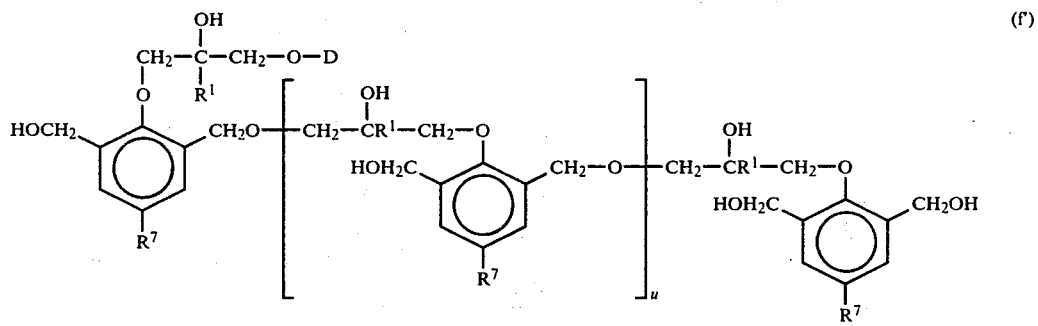 (f)

wherein u is 0, 1, 2 or 3, $R^1$ and D are as defined in formula (a'), and $R^7$, independently in each occurrence, is a $C_1$–$C_{12}$ alkyl, alkenyl, cycloalkyl, phenyl, phenylalkyl or alkylphenyl group; the average number ratio of

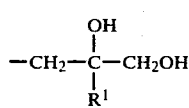

groups to

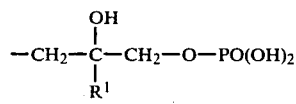

groups in said molecules being within the range of from 0 to about 2.3.

In the foregoing statement of the invention, and whenever used herein, the prefix "lower alk.-" refers to a $C_1$–$C_4$ alkyl group or a $C_2$–$C_4$ alkenyl group.

DETAILED DESCRIPTION

The epoxides preferably employed in the process of the invention are those of formulas (a), (d) and (f), particularly those in which Y is H or methyl, $R^1$ is H, and Z is a $C_1$–$C_4$ alkylene radical.

The most preferred epoxides of formula (a) are those of the structures

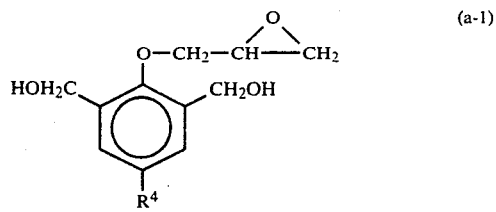 (a-1)

wherein $R^4$ is t-butyl or n-nonyl, and

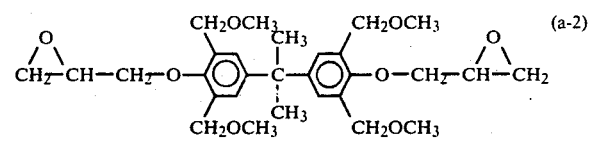 (a-2)

The most preferred epoxides of formula (d) are those

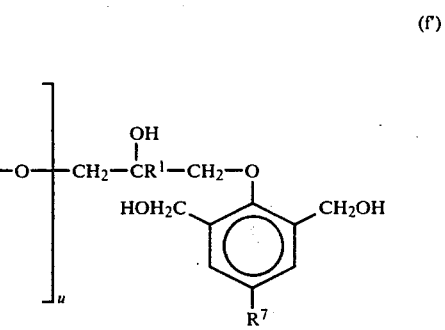

in which $R^1$ is H, Y is H, X is —$CH_2OY$ and a and b are each zero.

The most preferred epoxides of formula (f) are those in which u has an average value within the range of 1 to 2, $R^1$ is H and $R^7$ is a $C_4$–$C_{12}$ alkyl group.

In epoxides of formula (b), $R^1$ again is preferably H, p is preferably 2, s is preferably 1 and $R^6$ is preferably an alkyl group.

In epoxides of formula (c), $R^1$ preferably is H, Y is preferably H or —$CH_3$, Z is preferably $C_1$–$C_4$ alkylene, $R^4$ is preferably $C_1$–$C_{12}$ alkyl, d is preferably 0 and the average number of —$CH_2OY$ groups per molecule preferably is not greater than 3.

In epoxides of formula (e), $R^1$ is preferably H, Y is preferably —H or —$CH_3$, J is preferably —H or —$CH_3$, X is preferably —H, E is preferably —$CH_2OY$ and g is preferably 1.

In general, the epoxide (or epoxide mixture) and the phosphoric acid preferably are contacted with each other as components of a solution in an inert medium. By "inert" is meant that the medium does not detrimentally react with any of the components of the reaction mixture to such an extent that at least one of the objects of the present invention cannot be realized with the resin produced.

The practice of the present invention is not restricted to the use of one species of methylol- (or alkoxymethyl-) substituted epoxide at a time or to such epoxides in which all Y, $R^1$, $R^2$, $R^3$, $R^6$ or Z groups are the same throughout the molecule. Two or more distinct epoxides of any or all of preceding formulas (a) through (f) may be combined in a single reaction product with phosphoric acid. A given epoxide may comprise as many different kinds of the preceding groups as it is synthetically feasible to incorporate in individual molecules of formulas (a) through (f).

Exemplary epoxides of formula (a) which can be employed in the process of the invention are those methylol-substituted glycidyloxybenzene compounds derivable from the following known methylol-substituted phenols and bisphenols by known methods (see, for example, U.S. Pat. No. 3,859,255; columns 5–7):

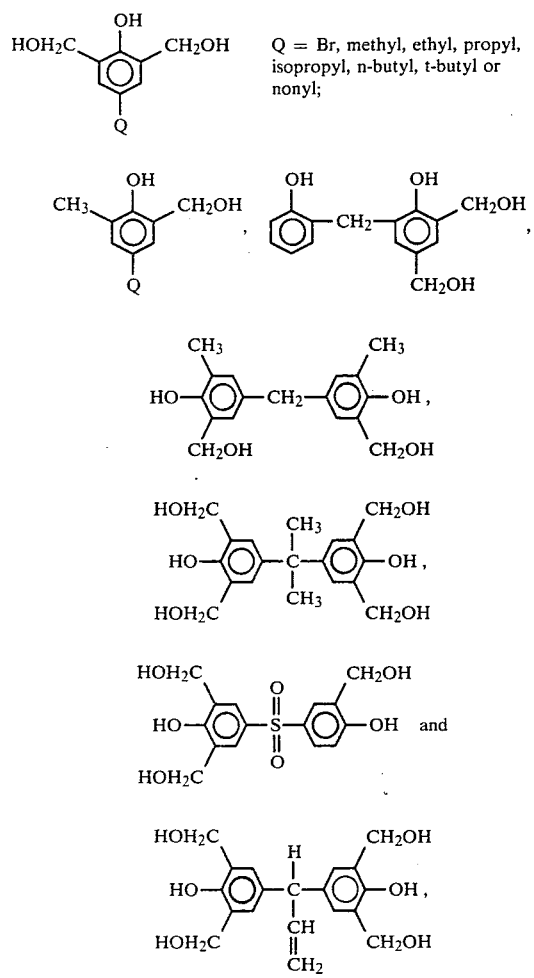

Q = Br, methyl, ethyl, propyl, isopropyl, n-butyl, t-butyl or nonyl;

The specific epoxides,

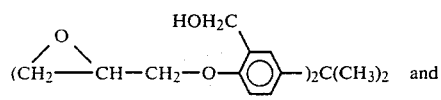

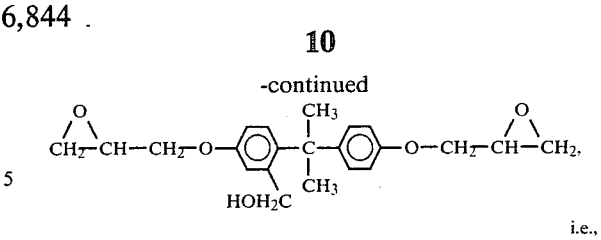

i.e., "APOGEN®" resins, are available from Schaefer Chemicals Inc., P. O. Box 132, Riverton, New Jersey.

Mixed glycidyl ethers of mono-, di- and trimethylol phenol can be prepared by "epoxidation" of the corresponding mixture of allyl ethers, which is marketed as METHYLON® Resin 75108 by General Electric Company. (See U.S. Pat. No. 2,965,607 for an epoxidation procedure.)

Additional exemplary type (a) epoxides are

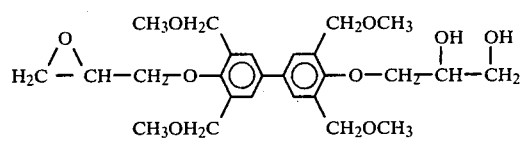

and

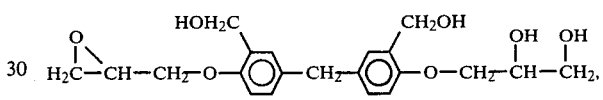

which can be prepared by careful reaction of water with the corresponding diepoxides in a 1 to 2 $H_2O$/oxirane ratio, as by dropwise addition of the water, as a dilute solution of a catalytic amount of phosphoric acid, to a highly stirred solution of the diepoxide in a solvent such as dioxane or methyl ethyl ketone. (Of course, some unconverted diepoxide and a corresponding quantity of fully hydrolyzed diepoxide will also be formed, but not in such amounts that the mixture will not exhibit essentially the character of the semi-hydrolyzed diepoxide.)

Exemplary epoxides of foregoing formula (b) are:

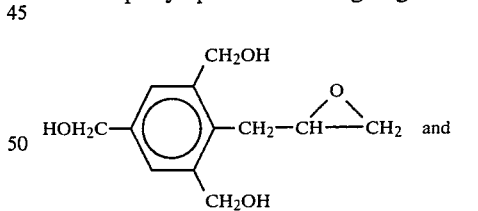

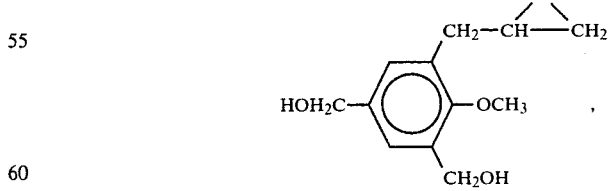

which can be made by the "epoxidation" procedure of Example XII, U.S. Pat. No. 2,965,607, from the respective precursor compounds, 1-allyl-2,4,6-trimethylolbenzene (U.S. Pat. No. 3,906,126) and 1-allyl-2-methoxy-3,5-dimethylolbenzene (U.S. Pat. No. 2,707,715).

Exemplary epoxides of formula (c) are:

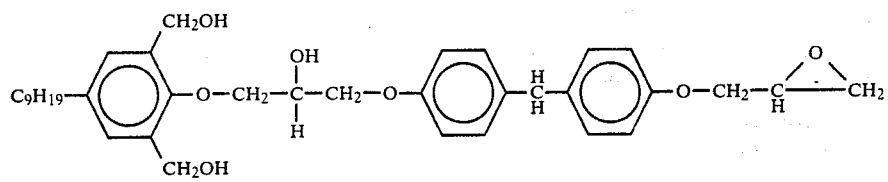

and

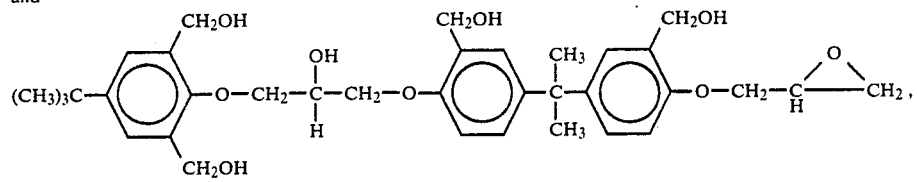

which can be prepared by reaction of the corresponding 4-alkyl-2,6-dimethylolphenols and diglycidyl ethers of Bis-A-type diphenols in the presence of a catalyst, such as ethyl-triphenyl phosphonium acetate, in a known manner.

Exemplary type (d) epoxides are the following methylolated, phenolphthalein diglycidyl ethers:

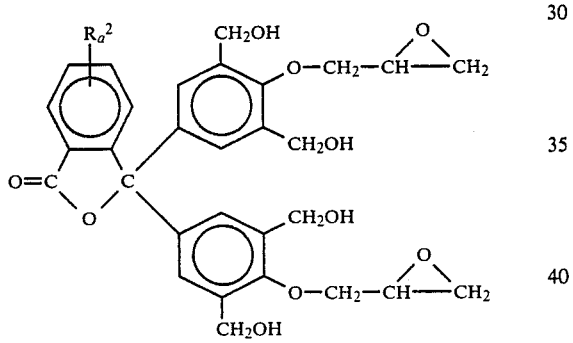

wherein a is O or $R^2=$—Cl or —Br and a=4.

These compounds are preparable, utilizing known types of procedures, from the corresponding phenolphthaleins by a sequence of two reactions; "methylolation" with formaldehyde, then "epoxidation" (in two steps) with epichlorohydrin.

The diglycidyl ethers of the tetrahalo-, tetramethylol compounds, upon reaction with phosphoric acid, yield difunctional phosphomonoesters of particular value as reactive, fire-retardant impregnants or coatings. Fire retardancy is contributed to not only by the phosphorous and halogen contents of these esters but also by $CO_2$ evolved upon thermal decomposition of the lactone group. As a consequence of the latter reaction, a reactive diradical forms. This radical can react with itself or other materials, thereby reducing flow tendencies.

Tetrahalo-phenolphthaleins of the preceding type are known materials. See U.S. Pat. No. 3,035,021.

Exemplary type (e) epoxides are the following, which may be prepared by methylolation and epoxidation of the corresponding tris-(hydroxyphenyl)methanes (the latter being described in copending application Ser. No. 646,730, entitled LEUCAURIN EPOXIDES, the disclosure of which is incorporated herein by reference).

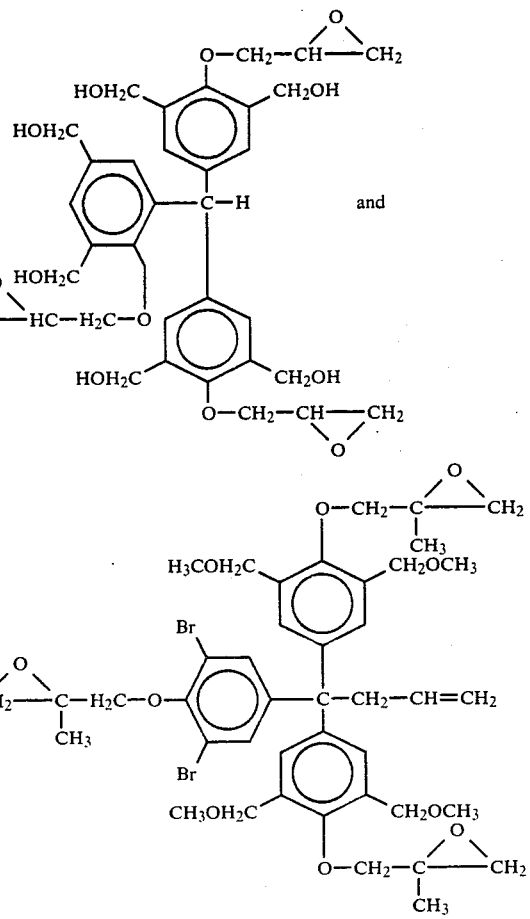

An exemplary type (f) epoxide is the one in which, in said formula, u is 3, and, in all occurrences, $R^1$ is H and $R^7$ is a tertiary butyl group. This epoxide is readily made as the predominent molecular species in the resinous mixture (EEW~1330) obtained by heating the glycidyl ether of 2,6-dimethylol-4-t-butylphenol for about 4.5 hours at 165° C. If the reaction is terminated after only about 1.75 hours, the EEW of the resin produced will be approximately that (798) corresponding to a trimer (u=1).

Some or all of the methylol groups present in epoxypropyl benzene compounds of the preceding types, or in the glycidyl ethers derivable from any of the foregoing methylol-substituted phenols, can be converted to corresponding alkoxymethyl groups by well known methods commonly utilized in making benzyl ethers.

The phosphoric acid utilized in the practice of the present invention may be provided in the form of such phosphoric acid-source materials as 100% orthophosphoric acid, the semi-hydrate $2H_3PO_4.H_2O$, aqueous solutions containing at least about 57.5 weight percent phosphoric acid ($H_3PO_4.4H_2O$) and the various condensed forms (polymeric, partial anhydrides) of phosphoric acid, as exemplified by dimetaphosphoric acid, pyrophosphoric acid and triphosphoric acid. When the acid source material is of the condensed type, sufficient water should be supplied, at some stage prior to curing the resinous end-product, to ensure that no substantial proportion of P—O—P links are left in the cured resin. Ordinarily, aqueous phosphoric acid solutions, particularly about 70-90% solutions, will be preferred.

If the product resin is to be foamed, sufficient water to render the resin foamable by heating can be provided with the phosphoric acid, i.e., by using aqueous phosphoric acid. Foamability may also be imparted by incorporation in the resin of heat-expandable microspheres, such as the iso-butene Saran microspheres marked by The Dow Chemical Company under the product designation XD-7683, for example.

The reaction of the present invention may be carried out with the neat reactants but it is generally advantageous to employ a reaction medium. Suitable media are "inert" materials which, in admixture with the reactants, form a solution or dispersion which is fluid at the reaction temperature to be employed. Preferred media are organic compounds or mixtures which are liquid at ordinary temperatures, have normal boiling points below about 150° C. and are solvents for the epoxide(s) and phosphoric acid source material(s) to be used. If a condensed form of phosphoric acid is used, the solvent preferably is capable of dissolving at least enough water so that hydrolysis of P—O—P links can be effected.

Exemplary solvents suited to the practice of the present invention are methylene chloride, carbon tetrachloride, benzene, toluene, ethyl acetate, "glyme", dioxane, acetone, methyl ethyl ketone, ethanol and isopropanol. The latter four liquids are representative of "inert" solvents which, though reactive with phosphoric acid and/or epoxides, are not detrimentally so to an intolerable extent; further, they may be diluted with completely unreactive solvents where it is desired to minimize the effects of their reactivity while utilizing their generally greater solvent action to a limited extent.

It has been observed that higher reaction rates are exhibited in the less polar solvents, such as carbon tetrachloride or xylene, whereas the reaction proceeds relatively slowly in more polar solvents, such as lower alcohols.

If excess or unconverted phosphoric acid is present after epoxide conversion is essentially complete and it is desired to remove this acid, it will generally be advantageous to employ a solvent which is immiscible or only poorly miscible with water, thereby facilitating acid removal by extraction therewith; this of course presumes that the epoxide/acid reaction product is not soluble in or readily emulsified by water.

The relative amounts of acid source material(s) and epoxide(s) employed in the practice of the invention are such as to provide about 0.7 or more and, preferably, about 2.5 to about 3.5, P—OH hydroxyls per oxirane (epoxide) group.

Whether or not any free phosphoric acid present upon completion of the reaction must be removed will depend on the use to be made of the resulting resin. The presence of a limited amount of the free acid can be tolerated and is even advantageous in certain applications, such as impregnation of plastic foams to reduce flammability. Ordinarily, not more than 2 molecules of $H_3PO_4$ per oxirane group will be employed and, in many cases, only so much orthophosphoric acid as will convert essentially all of the epoxide charged to phosphomonester groups will be used. However, amounts of acid such as to provide only one acidic hydroxyl per oxirane are more favorable to polymerization reactions, which may result in gelling of the reaction mixture if precautions are not taken to minimize oxirane reactions with methylol or other oxirane groups, rather than with P—OH groups in free phosphoric acid molecules.

The extent to which polymerization reactions compete with the desired oxirane/P—OH reaction can be minimized by slow addition of the epoxide(s) solution to a highly stirred body of a relatively concentrated solution of ~65-85% phosphoric acid in a solvent such as dioxane or MEK. Also, the rates of competing reactions apparently decrease more than the oxirane/acid reaction rate does upon lowering the reaction temperature.

Suitable reaction temperatures range from the lowest temperature at which the reaction proceeds at a detectable rate to the highest temperature at which self-condensation of the product resin does not proceed to such an extent as to gel the resin. In general, temperatures of from about 10° to about 105° C. are satisfactory. The range of from about 35° to about 80° is preferred as providing for a reasonable rate of P—OH/oxirane adduction without unduly favoring undesired side reactions. It should be noted that the reaction is noticeably exothermic when carried out neat or in less polar solvents ($CCl_4$, xylene, $CH_2Cl_2$, etc.).

In general, the reaction is continued until less than 1%, and preferably less than 0.5%, of the oxirane groups originally present are consumed. However, it is only necessary to convert as much of the epoxide as is required to produce a reaction product having essentially the character of the more highly reacted epoxide/acid products of the present invention. That is, epoxide conversion need be only essentially complete.

The following examples are for purposes of illustration and are not to be construed as limiting the present invention to an extent inconsistent with the claims appended with this specification.

Methods of Characterizing Products

1. Titration of acids.

The relative amounts of the phosphoric acid charged to the reaction which report in the product mixture as the free acid, as monoester groups and as diester groups may be determined as follows. A sufficient sample of the reaction mixture to provide about 1 milliequivalent (meq) of solids (based on acid present) is dissolved in 35 ml. of a solvent consisting of 66.7 wt.% 2-butanone, 16.65% methanol and 16.65% water. The solution is titrated with about 0.3 N methanolic tetrabutylammonium hydroxide, using a Metrohm/Hersian automatic titrimeter, to a second break (inflection) in the resulting conductivity vs. titrant-volume curve. 10 ml. of water and 10 ml. of 10% aq. $CaCl_2$ are added and allowed to react for about 10 minutes, thereby converting all phosphomono- and diester groups to neutral calcium salt groups. The free phosphoric acid is converted to the monoacidic phosphate, CaHPO$_4$. All of the calcium-containing products precipitate but a third break on the titration curve can now be observed, without interference from the second monoester proton, upon neutralization of the proton in the CaHPO$_4$ with more of the quaternary hydroxide base. The amount of base required to produce the first break is that consumed by the sole acidic proton in the diester and by the first protons in the monoester groups and the free acid. The additional amount of base required to reach the second break is that consumed by the second (last) proton in the monoester groups and by the second proton in the free acid. The additional amount of base to reach the last break is consumed solely by the last proton in the calcium salt derived from the free acid. If the total volumes of base solution required to reach the successive breaks are denoted as $v_1, v_2$ and $v_3$, the relative amounts of phosphate present as mono- and diester groups and as the free acid may be calculated from the following relationships:

Free $H_3PO_4 = v_3 - v_2$

Monoester $= 2v_2 - v_1 - v_3$

Diester $= 2v_1 - v_2$.

The proportion of the consumed epoxide groups reporting in the product as glycol groups (as a consequence of hydrolysis reactions) is calculable from the following relationship (assuming the only conversion products are glycol, monoester or diester groups:

$$\% \ e_g = 100 - \frac{M_a}{e_o - e_p} (\% \ m + 2 \ (\% \ d)) \quad (1)$$

$e_p$ = equiv. epoxide present in product as such (usually zero)
$e_o$ = equiv. of epoxide charged to reaction
$e_g$ = equiv. epoxide converted to glycol groups
$M_A$ = moles H$_3$PO$_4$ charged to reaction
%m = mole % charged acid reporting as monoester
%d = mole % charged acid reporting as diester.

2. Titration of oxirane groups.

The standard method of analysis, using a 25% solution of tetramethyl ammonium bromide in glacial HOAc and back-titrating against crystal violet with 0.1 N solution of perchloric acid in glacial AcOH, was found to be suitable and was employed in all determinations of oxirane contents.

EXAMPLES

EXAMPLE 1 - (A)

Preparation of 2,6-dimethylol-p-t-butylphenol (DMPTBP)

200 grams (1.331 moles) of para-t-butylphenol and 400 ml. of water were placed in a 2-liter, 3-neck, round bottom flask fitted with a thermometer, a stirrer and a dropping funnel. The flask was placed in a water bath, the contents stirred and 106.6 grams (1.331 moles) of 50% aq. NaOH added. The temperature of the resulting slurry was adjusted to 30° C. (by cooling) and 227 grams (~2.8 moles) of 37% formalin added. The mixture was heated to 60° C. and stirred at that temperature for 4 hours. It was then cooled to 35° C. and 444 ml. (1.331 moles) of 3 N aq. HCl were added. Enough dilute acetic acid was then added to make the mixture just acid. 100 ml. of chloroform was stirred in and the phases allowed to separate. The chloroform layer, containing essentially all of the product resin, was removed, washed once with water, dried by azeotropic distillation and stripped in vacuo. 276 grams (99% yield) of the title product was obtained as a resinous residue which crystallized on standing; equivalent wt. 220 grams per phenolic —OH (vs 212, theoretical).

-(B) Preparation of the glycidyl ether of DMPTBP (DMPTBP-epoxide, or DMPTBPE).

196 grams (1.09 moles) of the preceding resin was mixed with 1010 grams (10 moles) of epichlorohydrin. 1.96 grams of coupling catalyst (Benzyl trimethyl ammonium chloride, BTMAC) was added and the solution refluxed at 120° C. for one hour to effect phenolic-OH/oxirane adduction. 665 ml (1.996 moles) of 3 N aq. NaOH, saturated with Na$_2$CO$_3$, was divided into two portions of 444 and 221 ml. The resin solution and the first portion of aqueous caustic were stirred together at ~25° C. for one hour. The spent caustic phase was separated and removed. The second portion of fresh caustic was then stirred with the resin solution an hour at ~25° C., separated and removed. The resin solution was washed, dried and stripped, thereby giving 266 grams of the title epoxide (EEW 311, vs 267 theoretical).

EXAMPLE 2

- Reaction of DMPTBPE and H$_3$PO$_4$.

8.42 grams (0.027 equiv.) of DMPTBPE (Example 1), 2 grams of ethanol 2-B and 1.58 grams (0.041 equiv.) of 85% H$_3$PO$_4$ (~16 wt. % of reactants; ~1.5 P-OH/oxirane) were combined at room temperature. The temperature increased spontaneously to an estimated level of about 60°-70° C., then dropped after about 15 minutes total contact time. The resulting viscous resin was thinned with 3 grams more of ethanol (and one drop of a conventional flow control agent, Mallincrodt BYK-300). Coatings of the resulting clear, moderately viscous solution were drawn on aluminum and cold-rolled steel coupons. After being cured 10 minutes at 175° C., the coating on aluminum exhibited excellent hardness, was resistant to acetone and, after immersion in boiling water, showed a slight blush but passed the (tape) adhesion test and 30 in. lbs. reverse impact. After curing 10 minutes at 350° C., the coating on the steel coupon passed 50 in. lbs. of reverse impact.

EXAMPLE 3

- Effect of reactant ratio on properties of H$_3$PO$_4$/2,6-dimethylol-p-nonylphenolepoxide reaction product.

Each of six 1.17 grams (0.01 moles; 0.03 equiv.) portions of 84% H$_3$PO$_4$ was combined with successively greater amounts of the resinous epoxide (DMPNPE), which had an EEW of 341, and with from 1 to 25 grams of ethanol 2-B or xylene. The reactions were allowed to proceed (to 0% epoxide) overnight at room temperature and then coated onto MYLAR ®, cold-rolled steel and aluminum test panels. The coatings were cured at 175° C. for 5, 10 and 5 minutes, respectively, and evaluated. The amounts of epoxide, acid and solvent and the coating evaluation results are given in Table 1 following:

TABLE 1

| Run | 1 | | 3 | | 4 | | 5 | | 6 | |
|---|---|---|---|---|---|---|---|---|---|---|
| Equiv. ratio P—OH to oxirane | 3.04 | | 2.05 | | 1.52 | | 1.50 | | 1.14 | 0.46 |
| Amounts | g* | % | g | % | g | % | g | % | g | % | g | % |
| 85% $H_3PO_4$ | 1.17 | 25.8 | 1.17 | 19.0 | 1.17 | 14.8 | 1.17 | 14.6 | 1.17 | 11.5 | 1.17 | 5.0 |
| DMPNPE | 3.37 | 74.2 | 5.00 | 81.0 | 6.74 | 85.2 | 6.82 | 85.4 | 9.00 | 88.5 | 22.2 | 95.0 |
| EtOH | 1 gram | | 1 gram | | 0 | | 2 grams | | 4 grams | | 25 grams | |
| Xylene | 0 | | 0 | | 25 grams | | 0 | | 0 | | 0 | |

FILM PROPERTIES

| | | | | | | |
|---|---|---|---|---|---|---|
| on MYLAR ® | | | | | | |
| Color | Poor | Poor | Excellent | Excellent | Excellent | Excellent |
| Appearance | Poor | Poor | Excellent | Excellent | Excellent | Excellent |
| Acetone resis. | Failed | Failed | Pass | Failed | Failed | Failed |
| Boil'g. $H_2O$ resis. | Failed | Failed | Excellent | Excellent | Excellent | Excellent |
| Adhesion | Good | Good | Good | Good | Good | Failed |
| on COLD-ROLLED STEEL | | | | | | |
| Color | | | All Excellent | | | |
| Acetone Resis. | | | All Fair | | | |
| Rev. Impact | | | All Failed at 50 In. Lbs. | | | |
| Boil'g. $H_2O$ Resis. | | | All Excellent | | | |
| on ALUMINUM | | | | | | |
| Acetone Resis. | | | Excellent | | | Failed |
| Rev. Impact | | | Failed at 20 in. lb. | | | Failed at 20 in. lb. |
| Boil'g. $H_2O$ Resis. | | | Excellent | | | Excellent |

*grams

EXAMPLE 4

-Thermosetting mixture of Example 2 type $H_3PO_4$/epoxide reaction product with a resinous adduct of ethylene oxide and bis-phenol-A.

2.90 grams (0.025 moles; 0.075 equiv.) of 84% $H_3PO_4$ was added to a mixture of 17.1 grams (0.05 equiv.) of DMPNPE (actual EEW=341) with 4 grams of ethanol-2B. The mixture exothermed to 70° C., then cooled to room temperature. Portions of the resulting resinous mass designated as a, b and c were weighed out and combined with the ethanol-2B and an experimental flexibilizer (a resinous adduct of ethylene oxide and Bisphenol-A, in 2/1 mole ratio) in the proportions given in Table 2 below. A sample of each of the resulting mixtures was placed on a hot plate surface maintained at a temperature of about 150°-200° C. and found to cure in a few minutes without discoloration. A film of each mixture was then drawn on a cold-rolled steel coupon, cured for 10 minutes at 175° C. and evaluated as indicated in Table 2.

TABLE 2

| Portion | a | b | c |
|---|---|---|---|
| Wt. of portion, grams | 6.0 | 4.5 | 3.6 |
| Wt. EO/BA adduct | 0 | 1.25 | 2.0 |
| Wt. EtOH | 1.7 | 2.0 | 2.1 |
| Flow of mixture | Excellent | Fair | Poor |
| Acetone Resis. of film | Excellent | Slightly soft | Poor |
| Reverse Impact 50 in. lb. | Failed | Borderline | Failed |
| Boiling water resis. | Good | Good | Severe Blush |
| Rev. Impact after boiling $H_2O$ | Failed 50 in. lb. | Passed 50 in. lb. | Failed 50 in. lb. |

EXAMPLE 5

Preparation of reaction product of 84% of $H_3PO_4$ and diglycidyl ether of 2,6,2',6'-tetra(methoxymethyl)-bisphenol-A (actual EEW 287) and use to impart fire retardancy to wood.

The above-named reactants were mixed in a 1 to 2 acid/diepoxide mole ratio (8.67% $H_3PO_4$; ~1.8 P-OH/oxirane) at room temperature and the resinous mixture applied generously to two identical, ⅛" thick pieces of fir shingle. Most of the coating on one of the pieces was removed by wiping, shortly after application. The two pieces were heated several minutes at 120° C. to induce curing and then tested for fire retardancy as follows. The shingle piece is held so that its planar surfaces are inclined at about 35° to the horizontal and the flame of a Meeker burner is allowed to impinge on its underside until combustion is well established. The flame is then removed and the length of time the shingle piece continues to burn is noted. The amount and character of the char formed and the resistance of the charred piece to breaking is checked. An otherwise identical but uncoated piece of shingle is tested as a control. The results are given in Table 3.

TABLE 3

| Shingle Piece | Uncoated | Thinly Coated | Thickly Coated |
|---|---|---|---|
| Appearance flame removed | Normal | Bubbled but clear | Went out after |
| Condition after burning | 30 seconds | 5 seconds | 5 seconds |
| Strength | Poor | Good | Good |
| % charring | 100 | 25-50 | 25-50 |
| Char integrity | Loose | Firm | Very firm |

EXAMPLE 6

Preparation of higher $H_3PO_4$ content resin like that of Example 5 and use to impart fire retardancy to MYLAR ® film.

51.5 grams (0.267 equiv.) of the diglycidyl ether of 2,6,2',6'-tetra(methoxymethyl)-bisphenol-A, 33.2 grams of ethanol-2B, 15 grams (0.384 equiv.) of 84%. $H_3PO_4$ and 0.2 grams of a commercial wetting agent (BYK 300) were combined at room temperature. ($H_3PO_4$=18.9% of reactants; 1.44 P-OH/oxirane.) A slight exotherm occurred. The Gardner viscosity of the resulting mixture (64.3% non-volatiles) was 9.9 seconds. A coating of the mixture was drawn with a #18 wire wound rod on each of two pieces of a MYLAR ® film. One piece was heated five minutes at 160° C. and the other for 15 minutes at 160° C., to effect curing of the coatings. The coated pieces were then checked for resistance to boiling water and, in comparison with an uncoated piece of the same film, for resistance to ignition by a lighted match held at a lower edge of the sample. The results are given in Table 4 below.

TABLE 4

| Film sample | Uncoated | 5' cure | 15' cure |
|---|---|---|---|
| Effect of 30 min. in boiling water | — | blistered | none |
| Effect of attempted ignition. | Severe dripping and continued to burn rapidly after flame removed. | No dripping Self-extinguishing after flame removed. | |

In addition, 1 gram of the same uncured, acid/epoxide reaction mixture was applied as a penetrant to a 0.85 gram piece of readily combustible, rigid polyurethane film and was foamed and cured in situ by heating to 120°. The treated foam could not be ignited with a match and was only burned about halfway through after being exposed for one minute to the flame of an acetylene torch.

EXAMPLE 7

Preparation of fire retardant, rigid foam from $H_3PO_4$ and the diglycidyl ether of 2,6,2',6'-tetra(methoxymethyl)-bisphenol-A (tetramethoxymethyl-bisphenol-A diepoxide; TMMBPADE).

10 grams of Saran microspheres were mixed with 65 grams (0.226 equiv.) of TMMBPADE at room temperature and then 15 grams (0.128 equiv.) of 84% $H_3PO_4$ ($H_3PO_4$ 16% of reactants; 1.76 P-OH/oxirane) was stirred in and stirring continued, with cooling) until the mixture began to thicken (about 30 seconds). A coating of the mixture, about 10 mils thick, was formed on a piece of MYLAR ® film, allowed to age about ten minutes at room temperature and then warmed in a 120°-130° C. oven for another ten minutes to expand the microspheres contained in the resin. The expanded resin was then cured 10 minutes at 175°. The resulting product (after the MYLAR was peeled off) was a rigid, low density foam with excellent appearance and strength, of uniform structure and consisting of cells within the range of from about 0.02 to 0.15 mm in size. An edge of a ½"×4"×⅝" thick slice of the foam was held in contact with a Meeker flame for about five minutes (no flame spread observed) and then removed. The flame went out in 5 seconds. The burned portion was severely charred but firm.

For comparison, ignition and retardancy were checked for two commercial polystyrene and polyurethane rigid foams which at one time were considered to be "fire retardant". A ½"×4""⅜" sample of each foam was held in a vertical position about three inches above a Meeker burner and exposed to the edge of the flame. The polyurethane foam caught fire almost explosively and continued to burn, when removed from contact with the burner flame, until almost completely consumed. The polystyrene foam also ignited rapidly and burned, when removed from the flame, until about 90% consumed.

When weighed samples of each of the preceding three foams were held in aluminum dishes over a Meeker flame, the foam of the present invention lost only 47% of its weight in a time sufficient for weight losses of 97% and 96.4%, respectively, from the polystyrene and polyurethane samples.

EXAMPLE 8

Reactions of $H_3PO_4$ and paratoluene sulfonic acid with the 1:1 adduct of 2,6-dimethylol-p-t-butylphenol and DER ®-331.

63.4 grams of DER ®-331 (the diglycidyl ether of Bisphenol A; EEW ~190), 36.6 grams of the title phenol and 1 gram of benzyl trimethyl ammonium chloride catalyst were heated to 100° C. and maintained at that temperature (2.3 hours) until the epoxide content was 7.46%. The product resin was dissolved in an equal weight of ethanol-2B and different portions of the resulting solution were combined with phosphoric acid and p-toluene sulfonic acid (PTS) in the amounts shown in Table 5 below. Films of each mixture were drawn with a #8 wire wound rod on aluminum test panels, cured ten minutes at 190° C. and compared as indicated in Table 5.

TABLE 5

| Acid | None | | $H_3PO_4$ | | PTS | |
|---|---|---|---|---|---|---|
| Weight % | 0 | 1 | 3 | 5 | 1.5 | 3.0 |
| Acetone Resis. | Poor | Poor | Excellent | | Poor | Poor |
| Boil'g $H_2O$ Resis. | Blush | Blush | No Effect | | Blush | Blush |
| 24 in. lb. reverse impact after 30' in boiling $H_2O$ | — | — | Pass | Borderline | — | — |

EXAMPLE 9

Reaction of $H_3PO_4$ with monofunctional epoxide (1:1 adduct of the diglycidyl ether of bisphenol-F with 2,6-bis(methoxymethyl)-4-t-butylphenol).

116 grams (0.7 equiv.) of an experimental resin, consisting essentially of the diglycidyl ether of bisphenol-F and having an EEW of 165, was mixed with 84 grams (0.35 equiv.) of the above-named phenol and 1 gram of benzyl trimethyl ammonium chloride. The mixture was heated at 130° until (6 hours) the % epoxide therein was 11.8 (EEW 380). Another gram of the onium chloride coupling catalyst was added and heating was continued 2 more hours. The % epoxide in the mixture was then 7.3%, corresponding to an EEW of 590 (vs. 570 theoretical for the 1:1 adduct).

Two portions of the product resin were mixed with ethanol-2B and 85% phosphoric acid, in the following proportions: (A) resin 8.53 grams, $H_3PO_4$ 1.47 grams (14.7% of reactants), ethanol, 10 grams; (B) resin 5.9 grams, $H_3PO_4$ 1.16 grams (3 P-OH/oxirane; 16.5% of reactants) and ethanol, 2.54 grams.

Films of the two mixtures were drawn on aluminum coupons and cured 10 minutes at 350° C. After being immersed in boiling water 30 minutes, film (A) passed 20 inch pounds reverse impact, and film (B) passed 50 inch pounds reverse impact. (B) was also acetone resistant.

A third portion of the product resin was mixed with 85% $H_3PO_4$ in an amount constituting 7.5% of the mixture. The mixture foamed and solidified when heated to 175° C. The resultant foam was resistant to flame and was found to have an oxygen index of 0.25–0.30.

EXAMPLE 10

Preparation of high acid content, fire retardant foam from TMMBPADE, Saran microspheres, a polyol and $H_3PO_4$. No solvent used.

11 grams (0.04 equiv.) of TMMBPADE, 11 grams of a polyol (a 3/1 mole ratio adduct of ethylene oxide with bisphenol-A), 0.5 grams of Saran microspheres and 11 grams (0.1 moles) of 85% $H_3PO_4$ (27.9% $H_3PO_4$ in reaction mixture; 7.5 P-OH/oxirane) were mixed together. The mixture was shaped between two pieces of MYLAR film and, when heated 5 minutes at 125° C., increased in volume about 4-5 times and formed a rigid, low density foam. A sample of the foam could not be set afire by the flame of a Meeker burner and retained its rigidity. Another sample showed no significant shape change or strength loss after being immersed in water overnight. Although some acid leaching was indicated by the pH ($\infty$2-3) of the water, the fire retardancy of the (dried) sample was excellent.

EXAMPLE 11

Protective coating, on Birch plywood of TMMBPADE and phosphoric acid (no polyol).

The diepoxide (EEW 525) and 85% $H_3PO_4$ were combined in three different proportions: I, 9.5% acid; II, 15% acid; and III, 20% acid. Pieces of birch plywood were thinly coated with I, II or III and allowed to stand at room temperature. Coating I was firm and dry after 2 hours. Coatings II and III were still tacky after standing overnight. When heated at 100° C., Coating I was well cured after about 2-5 minutes, Coating II was slightly tacky after 1 hour and Coating III was wet after 1 hour. The appearances of the cured coatings on I and II were excellent. When the coated surfaces of the test pieces coated with I and II were held in the flame of a Meeker burner for 1.5 minutes, a hard, solid char layer formed in each area of contact with the flame and some blistering occurred. Burning did not continue when the flame was removed.

EXAMPLE 12

Reaction of 940 EEW oligomer of 2,6-dimethylol-4-t-butylphenyl glycidyl ether with 85% $H_3PO_4$ in MEK. (1.5 P-OH /oxirane: $H_3PO_4$=5.0% of reactants).

One hundred grams of the oligomer (formula (f), average value of u=~1.5) was mixed with an equal weight of MEK and 6.13 grams of the acid was stirred in. The mixture was heated and refluxed at about 80° C. until (5 hours) the epoxide content was 0.3%. The reaction mixture was readily flowable and gave a good film when drawn with a #3 wire wound rod on a cold rolled steel panel. When cured 4 minutes at 197° C., the film had the following properties:

Coating weight 2 mg/in².
Passed 20 in. lb. reverse impact.
Passed 100 acetone double rubs.
No blush or softening after 30 minutes in boiling water.
Good adhesion—no pull off in conventional crosshatch adhesion test.

Coatings were drawn from the reaction mixture on both sides of a heavy gauge Mylar panel and cured 5 minutes at 195° C. The cured coatings were hard but flexible. The fire retardancy of a piece of the coated panel was compared to that of an uncoated piece of the same Mylar film. When ignited with a match, the uncoated film dripped and continued to burn after the match flame was removed. In the vertical position, the coated film burned slowly, without dripping. In the horizontal position, the coated film stopped burning as soon as a char ridge was formed around the burning area.

EXAMPLE 13

Effect of water/acid ratio on composition and properties of reaction product from aq. $H_3PO_4$ and DMMPTBPE. (3 P-OH/oxirane.)

Each of four 100 gram (0.229 equiv.) portions of the glycidyl ether of 2,6-di(methoxymethyl)-4-t-butylphenol was dissolved in an equal weight of dichloromethane. Aqueous phosphoric acid (of successively lower concentrations; 94, 85, 65 and 40 wt. %'s) was added to each solution in an amount such as to provide 3 H+ per oxirane. Each mixture was heated to reflux temperature with stirring. The 40% acid did not give a single phase mixture but the components of the other three mixtures were compatible. Each mixture was allowed to reflux until epoxide conversion was essentially complete. The heterogeneous reaction with the 40% acid was slow, requiring 23 hours, but the other reactions were complete in 6 hours.

Each reaction mixture was analyzed for free acid, monoester and diester contents and the contents of hydrolysis product (2,6-di(methoxymethyl)-4-t-butylphenyl ether of glycerol) calculated.

An additional run with 85% phosphoric acid, but in an amount such as to provide only 1.5 H+ per oxirane, was carried out. This (homogeneous) reaction was also complete in 6 hours.

The results for the five runs are summarized in Table 6 following:

TABLE 6

| Run | Grams $H_3PO_4$ | Grams $H_2O$ | Acid Strength % | Mole Ratio Acid/$h_2O$ | P-OH/Oxirane | Mole % Phosphate Present in Product As | | | % Oxirane Converted to | | | % Free $H_3PO_4$ in Product Dry Basis* | % $H_2O$ In Product** |
|---|---|---|---|---|---|---|---|---|---|---|---|---|---|
| | | | | | | Mono-ester | Di-ester | Free Acid | Mono-ester | Di-ester | Glycol | | |
| A | 21.30 | 1.36 | 94 | 3:1 | 3.0 | 42.5 | 3.7 | 53.8 | 42.5 | 7.4 | 50.1 | 9.44 | 0 |
| B | 22.43 | 3.96 | 85 | 1:1 | 3.0 | 32.7 | 2.0 | 65.3 | 32.7 | 4.0 | 63.3 | 11.96 | 1.12 |
| C | 22.43 | 12.08 | 65 | 1:3 | 3.0 | 29.8 | 1.8 | 68.4 | 29.8 | 3.6 | 66.6 | 12.53 | 6.93 |
| D | 22.48 | 33.65 | 40 | 1:8 | 3.0 | 0 | 0 | 100.0 | 0 | 0 | 100.0 | 18.34 | 18.89 |
| E | 11.21 | 1.98 | 85 | 1:1 | 1.5 | 48.2 | 8.0 | 43.8 | 24.0 | 8.0 | 68.0 | 4.42 | 0.04 |

*$h_2O$ and solvent free.
**Solvent free.

Films were drawn with a #18 rod from each of products A through E on 3"×9" heavy gauge Mylar panels and cured 20 minutes at 170° C. The cured films were soft enough to be marred with a fingernail and were not very resistant to acetone or boiling water. However, in comparison to an identical but uncoated Mylar panel, the films coated with products A, B and C were significantly more fire retardant. Table 7, following, gives the rates at which each panel burned while held in contact with a flame and shows whether the panel dripped while burning and whether it stopped burning when the flame was removed.

TABLE 7

| Coating # | Burn Rate cm²/second | Dripped ? | Self-Extinquishing ? |
|---|---|---|---|
| A | 0.24 | No | Yes |
| B | 0.15 | No | Yes |
| C | 0.24 | No | Yes |
| D | 0.83 | Yes | No |
| E | 0.97 | No | No |
| Uncoated | 1.33 | Yes | No |

It is evident from the data in Tables 6 and 7 that fire retardancy drops off as the ratio of glycol to phosphate ester groups increases. The ratio for the product of run C, which gave a self-extinguishing, non-dripped coating, was 66.6÷(29.8+3.6) or about 2 glycol groups per phosphoester group. It is also evident that the inclusion of a substantial amount of phosphate as the free acid does not suffice to render fire retardant a product such as was obtained in run D, i.e., a product containing no phosphoester groups.

The fire-retardant compositions of the present invention may be characterized as consisting essentially of from 0 to about 25 weight percent of phosphoric acid and from about 75 to 100 weight percent of organic molecules derivable from the starting epoxide by hydrolysis of or P—OH adduction with the oxirane groups contained therein. This, of course, is with the proviso that the number ratio of glycol groups to monoester groups is within the range of from 0 to about 2.3. The epoxide/acid reaction products may additionally contain up to about 10 weight percent of phosphodiester groups, without losing their essential character. The diesters contain only about half as much phosphate (PO₄=⁻) per unit weight of organic material and are therefore less efficient in imparting flame retardancy. However, they are generally formed in only minor amounts and, furthermore, strongly tend to undergo hydrolysis to glycols and monoesters. Since water will generally be introduced with the acid or subsequently (when a condensed phosphoric acid source material is used), any diester present will ordinarily have the effect of an equivalent 1:1 mixture of glycol and monoester.

The presence of limited amounts of the glycols is not excessively detrimental to fire retardancy and is otherwise advantageous in providing additional hydroxyl groups for cross-linking or attachment of pendant molecules containing hydroxyl-reactive functions. Accordingly, it is not necessary to carry out the P—OH/epoxide reaction in the absence of water. However, if it is desired to obtain an essentially glycol-free product, this may be done by adding the epoxide incrementally to a highly stirred solution of 100% or higher (condensed) H₃PO₄ in a solvent such as dioxane, at a temperature at which P—OH/oxirane adduction proceeds rapidly. Once all the epoxide is converted, water may be used to cleave any P—O—P bonds remaining and to remove the solvent and as much of the free acid as desired.

What is claimed is:

1. The method of preparing a heat-curable, flame retardant resin which comprises:

contacting a methylol- or alkoxymethyl-substituted epoxide, as defined below, with orthophosphoric acid (H₃PO₄) mixed with 0 to 4 molecular proportions of water per molecular proportion of H₃PO₄, the amount of acid being such as to provide at least 0.7 P—OH hydroxyls per oxirane group, until essentially all of the oxirane groups originally present in said epoxide have been converted to glycol or phosphoester groups, said epoxide consisting essentially of molecules, each of which, independently, is of the formula

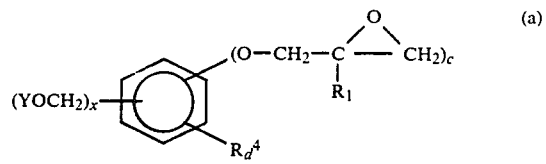

wherein Y is H or a C₁ to C₄ alkyl or C₂–C₄ alkenyl group, each YOCH₂— group is either ortho or para to a glycidyloxy group, x is 1, 2 or 3, c is 1 or 2 and d is 0 or 1;

R¹, independently in each occurrence, is H, methyl or ethyl;

R⁴ is Br, Cl, a C₁–C₁₂ alkyl, alkenyl, cycloalkyl, phenyl, alkylphenyl, phenalkyl or phenoxy group, a

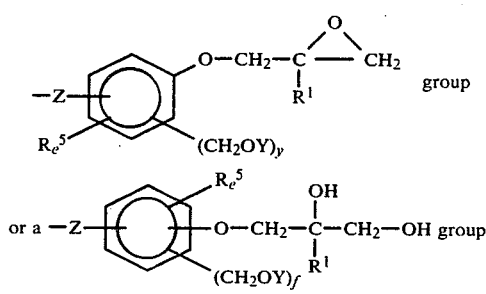

wherein, independently, in each of the latter two groups, Z is >C(CF₃)₂, —SO₂—, —S—, —O—, or a valence bond, R¹ is —H, —CH₃ or —C₂H₅, R⁵ is a C₁ to C₁₂ alkyl, alkenyl, cycloalkyl, phenyl, alkylphenyl, phenoxy, —Br or —Cl group, y and f are each 0, 1 or 2 and e is 0 or 1;

and (x+f) is not greater than 4 and (x+y) is 2, 3 or 4;

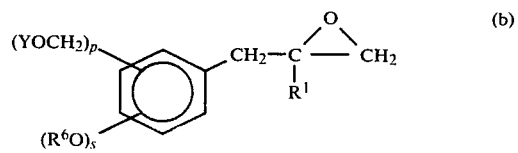

wherein s is 0 or 1 and p is 1, 2 or 3;

R⁶ is a C₁ to C₁₂ alkyl or a

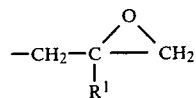

group, and $R^1$ and Y are defined as in formula (a),

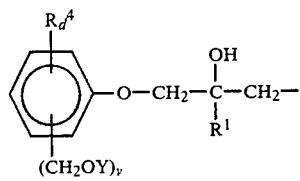 (c)

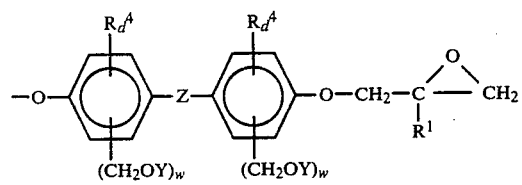

wherein Y, $R^1$, $R^4$, d and Z are as defined as in formula (a), v is 1, 2 or 3 and w, independently in each occurrence, is 0, 1 or 2,

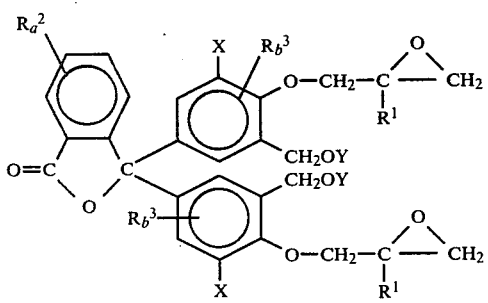 (d)

wherein, independently, in each occurrence $R^1$ is H, methyl or ethyl,

X is H, —CH$_2$OY, —Br, Cl or a $C_1$-$C_4$ alkyl or alkenyl group, $R^2$ is —Br or —Cl, $R^3$ is methyl or ethyl, Y is H or a $C_1$-$C_4$ alkyl or alkenyl group, a is 0, 1, 2, 3 or 4 and b is 0 or 1,

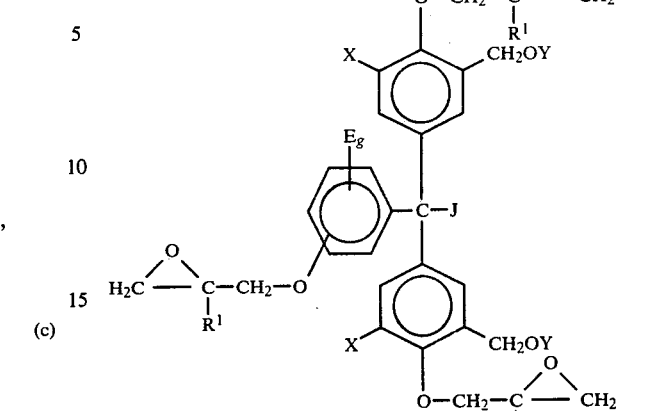

wherein,
J is H or a $C_1$-$C_{10}$ alkyl or alkenyl group,
Y is H or a $C_1$-$C_4$ alkyl or alkenyl group,
$R^1$ is H, methyl or ethyl
X is H, —CH$_2$OY, —Br, —Cl or a $C_1$-$C_4$ alkyl or alkenyl group, independently in each occurrence,
E is —CH$_2$OY, —Br, —Cl or a $C_1$-$C_4$ alkyl group, independently in each occurrence, and
g is 0, 1 or 2, or (f) methylol substituted, oligomeric monoepoxides of the formula

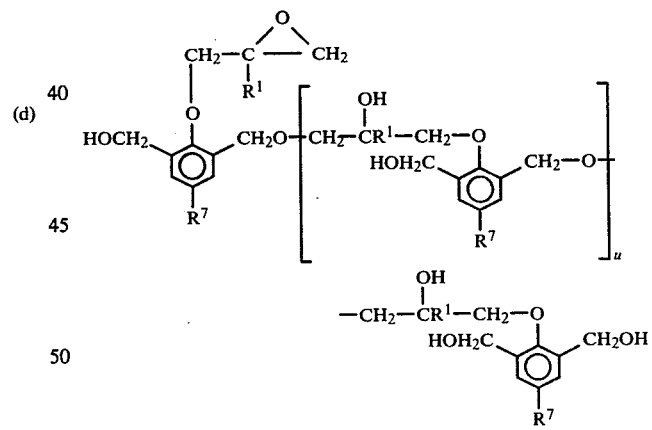

wherein
u is 0, 1, 2 or 3, $R^1$, independently in each occurrence, is H, methyl or ethyl and $R^7$, independently in each occurrence, is a $C_1$-$C_{12}$ alkyl, alkenyl, cycloalkyl, phenyl, phenalkyl or alkylphenyl group.

2. The method of claim 1 in which said epoxide is of formula (a), (d) or (f).

3. The method of claim 2 in which said epoxide is of formula (a).

4. The method of claim 2 in which said epoxide is of formula (d).

5. The method of claim 2 in which said epoxide is of formula (f).

6. The method of claim 1 additionally comprising applying said composition to a substrate and then curing it in place.

7. The method of claim 1 in which sufficient water is included with the phosphoric acid to render said resin foamable by heating.

8. The method of claim 7 comprising, as an additional step, so foaming said resin.

9. The method of claim 1 in which, as an additional step, heat-expandable microspheres are incorporated in said resin.

10. The method of claim 9 comprising, as a further step, expanding said microspheres, by heating the resin in which they are incorporated, thereby foaming the resin.

11. The method of claim 3 in which said epoxide is of the formula

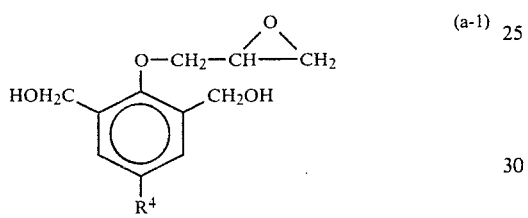

wherein $R^4$ is t-butyl or n-nonyl,
or

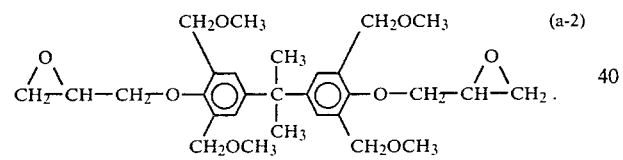

12. The method of claim 4 in which, in said formula (d), $R^1$ and Y are each H, X is —CH$_2$OY and a and b are each zero.

13. The method of claim 5 in which, in said formula (f), u has an average value within the range of from 1 to 2, $R^1$ is H and $R^7$ is a $C_4$–$C_{12}$ alkyl group.

14. The method of claim 1 in which said epoxide is of formula (c) and $R^1$ is H, Y is H or —CH$_3$, Z is a $C_1$–$C_4$ alkylene group, $R^4$ is a $C_1$–$C_{12}$ alkyl group, d is zero and the average number of —CH$_2$OY groups per molecule is 3 or less.

15. The method of claim 1 in which said epoxide is of formula (e) and $R^1$ is H, Y is H or —CH$_3$, J is H or —CH$_3$, X is H, E is —CH$_2$OY and g is 1.

16. A resinous, heat-convertible, fire-retardant composition consisting essentially of
   (A) from 0 to 25 wt. percent of free H$_3$PO$_4$, and
   (B) from 75 to 100 wt. percent of organic molecules, each of which, independently, is of the formula

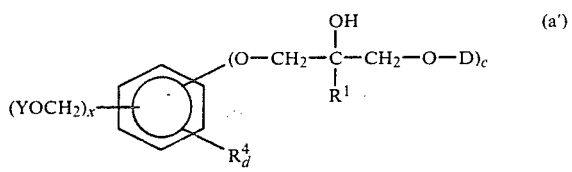

wherein
Y is H or a $C_1$ to $C_4$ alkyl or a $C_2$–$C_4$ alkenyl group and each YO-CH$_2$— group is either ortho or para to an

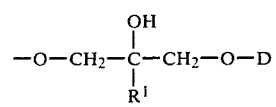

group,
D is H or PO(OH)$_2$,
x is 1, 2 or 3, c is 1 or 2 and d is 0 or 1;
$R^1$, independently in each occurrence, is H, methyl or ethyl;
$R^4$ is Br, Cl, a $C_1$–$C_{12}$ alkyl, alkenyl, cycloalkyl, phenyl, alkylphenyl, phenalkyl or phenoxy group, or a

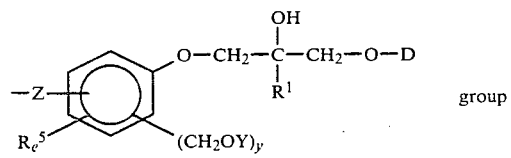

in which, Z is >C(CF$_3$)$_2$, —SO$_2$, —SO$_2$, —S—, —O— or a valence bond,
$R^1$ is —H, methyl or ethyl;
Y and D are as above defined;
$R^5$ is Br, Cl, a $C_1$–$C_{12}$ alkyl, alkenyl, cycloalkyl, phenyl, alkylphenyl or phenoxy group;
y is 0, 1 or 2 and e is 0 or 1;
(x+y) is 2, 3 or 4;
and the number ratio of D's which are H to D's which are PO(OH)$_2$ is about 1 or less;

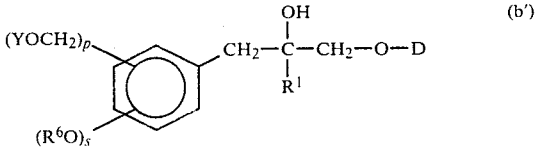

wherein
$R^1$, Y and D are defined as in formula (a'),
$R^6$ is a $C_1$ to $C_{12}$ alkyl or a

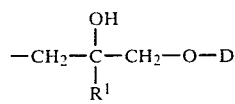

group,
s is 0 or 1 and p is 1, 2 or 3;

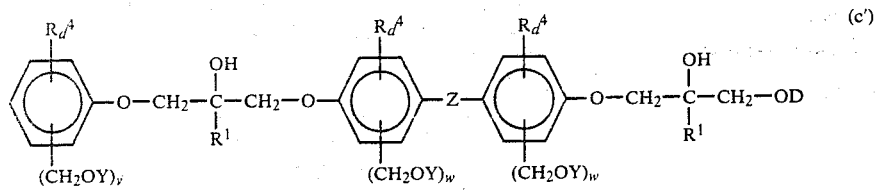

wherein Y, $R^1$, $R^4$, D, Z and d are as defined as in formula (a'), v is 1, 2 or 3 and w, independently in each occurrence, is 0, 1 or 2;

wherein,
J is H or a $C_1$-$C_{10}$ alkyl or alkenyl group,
$R^1$, Y and D are as defined in formula (a'),
X is H, —$CH_2OY$, —Br, —Cl or a $C_1$-$C_4$ alkyl or alkenyl group, independently in each occurrence,
E is —$CH_2OY$, —Br, —Cl or a $C_1$-$C_4$ alkyl group, independently in each occurrence, and
g is 0, 1 or 2, or (f')

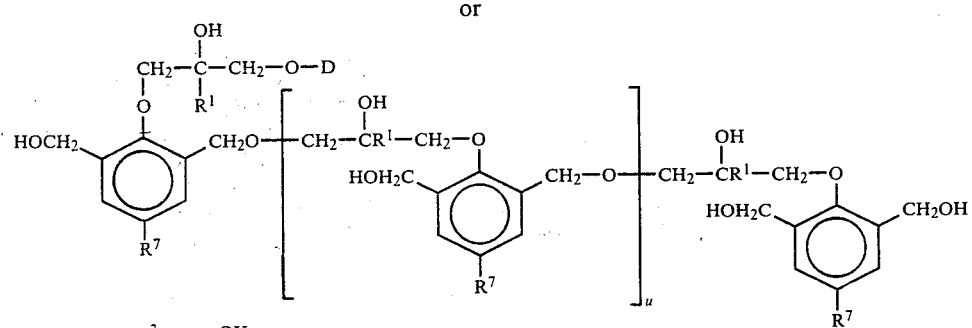

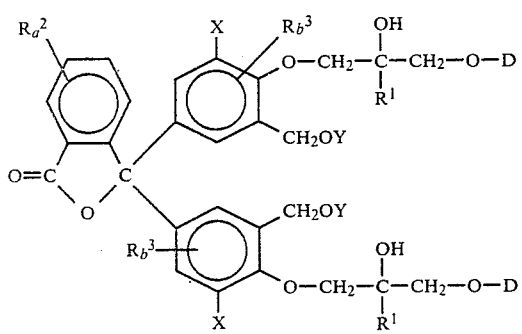

wherein, independently, in each occurrence
$R^1$, Y and D are as defined in formula (a'), X is H, —$CH_2OY$, —Br, Cl or a $C_1$-$C_4$ alkyl or alkenyl group,
$R^2$ is —Br or —Cl,
$R^3$ is methyl or ethyl,
a is 0, 1, 2, 3 or 4 and b is 0 or 1;

wherein
u is 0, 1, 2 or 3,
$R^1$ and D are as defined in formula (a'), and
$R^7$, independently in each occurrence, is a $C_1$-$C_{12}$ alkyl, alkenyl, cycloalkyl, phenyl, phenalkyl or alkylphenyl group;
the average number ratio of

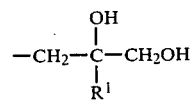

groups to

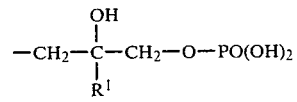

groups in said molecules being within the range of from 0 to about 2.3.

17. The composition of claim 16 in which said molecules are of formula (a'), (d') or (f').
18. The composition of claim 17 in which said molecules are of formula (a').
19. The composition of claim 17 in which said molecules are of formula (d').
20. The composition of claim 17 in which said molecules are of formula (f').
21. The composition of claim 18 in which said molecules are of the formula (e')

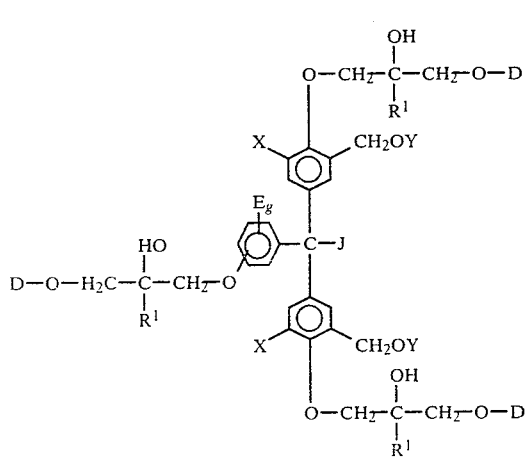

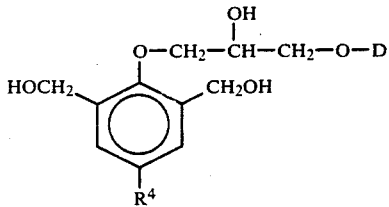

wherein $R^4$ is t-butyl or n-nonyl,

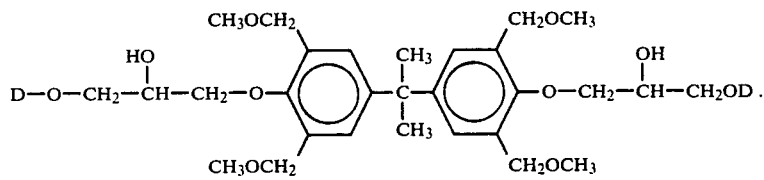

22. The composition of claim 19 in which, in said molecules of formula (d'), $R^1$ and Y are each H, X is $CH_2OY$ and a and b are each zero.

23. The composition of claim 20 in which, in said formula (f'), u has an average value within the range from 1 to 2, $R^1$ is H and $R^7$ is a $C_4$-$C_{12}$ alkyl group.

24. The composition of claim 23 in which $R^7$ is t-butyl.

25. The composition of claim 17 in which said molecules are of formula (e') and $R^1$ is H, Y is —H or —$CH_3$, J is —H or —$CH_3$, X is —H, E is $CH_2OY$ and y is 1.

26. The composition of claim 17 comprising an amount of water such that said composition can be foamed by heating it.

27. The composition of claim 17 additionally comprising heat-expandable microspheres.

28. The composition of claim 17, coated onto or impregnated into a combustible substrate material.

29. The composition of claim 26, in the form of a coating on a combustible substrate material.

30. The composition of claim 27, in the form of a coating on a substrate material.

* * * * *

UNITED STATES PATENT AND TRADEMARK OFFICE
CERTIFICATE OF CORRECTION

PATENT NO. : 4,256,844

DATED : March 17, 1981

INVENTOR(S) : P. H. Martin; P. G. Schrader; R. R. Stringham

It is certified that error appears in the above—identified patent and that said Letters Patent is hereby corrected as shown below:

Column 3, the first formula, that portion of the formula reading $R_1$ should read $R^1$;

Column 7, line 49, delete "phenylalkyl" and insert -- phenalkyl --;

Column 17, Table 1, Run #2 should be numbered -- 2 -- in numerical order in the first line;

Column 17, line 62, delete "of" after "84%";

UNITED STATES PATENT AND TRADEMARK OFFICE
CERTIFICATE OF CORRECTION

PATENT NO. : 4,256,844

DATED : March 17, 1981

INVENTOR(S) : P. H. Martin; P. G. Schrader; R. R. Stringham

It is certified that error appears in the above—identified patent and that said Letters Patent is hereby corrected as shown below:

Column 18, Table 3, please delete the table and insert Table 3 as shown below:

TABLE 3

| Shingle Piece | Uncoated | Thinly Coated | Thickly Coated |
|---|---|---|---|
| Appearance Before Burning | Normal | Bubbled but clear | Opaque, white |
| Burn time after flame removed | Let continue 30 seconds | Went out after 5 seconds | Went out after 5 seconds |
| Condition after burning | | | |
| Strength | Poor | Good | Good |
| % charring | 100 | 25-50 | 25-50 |
| Char integrity | Loose | Firm | Very firm |

UNITED STATES PATENT AND TRADEMARK OFFICE
CERTIFICATE OF CORRECTION

PATENT NO. : 4,256,844

DATED : March 17, 1981

INVENTOR(S) : P. H. Martin; P. G. Schrader; R. R. Stringham

It is certified that error appears in the above—identified patent and that said Letters Patent is hereby corrected as shown below:

Column 19, line 57, after the word "A", should read
-- 1/2" x 4" x 3/8" -- ;

Column 21, line 19, after "pH", should read -- (~2-3) --;

Column 21, Table 6, the last line of the fifth heading should read -- Acid/$H_2O$ -- ;

Column 21, Table 6, after the first * footnote, the "h" in "$H_2O$ should be capitalized;

Column 23, line 22, delete "non-dripped" and insert --non-dripping--;

Column 23, line 64, there should be a space between the words "remaining" and "and";

Column 24, the first formula, that portion of the formula reading $R_1$ should read $R^1$ ;

UNITED STATES PATENT AND TRADEMARK OFFICE
CERTIFICATE OF CORRECTION

PATENT NO. : 4,256,844

DATED : March 17, 1981

INVENTOR(S) : P. H. Martin; P. G. Schrader; R. R. Stringham

It is certified that error appears in the above—identified patent and that said Letters Patent is hereby corrected as shown below:

Column 28, line 38, delete the last reference to "$-SO_2-$";

Column 31, line 12, before the last formula shown, the word -- or -- should be inserted at the margin.

Signed and Sealed this

Third Day of November 1981

[SEAL]

Attest:

GERALD J. MOSSINGHOFF

Attesting Officer — Commissioner of Patents and Trademarks